United States Patent
Mahler

[11] Patent Number: 5,433,021
[45] Date of Patent: Jul. 18, 1995

[54] WATERPROOF FOOT COVERING

[75] Inventor: Rolf-Dirk Mahler, Pune, India
[73] Assignee: Akzo N.V., Netherlands
[21] Appl. No.: 136,818
[22] Filed: Oct. 18, 1993

[30] Foreign Application Priority Data

Oct. 17, 1992 [DE] Germany .................. 42 35 096.4

[51] Int. Cl.⁶ ........................................ A43C 13/08
[52] U.S. Cl. ......................................... 36/12; 36/14;
36/21; 36/55; 12/142 E; 12/142 T
[58] Field of Search ............... 36/12, 14, 17 R, 17 A, 36/17 PW, 18, 21, 22, 23, 55, 84; 12/142 E, 142 T

[56] References Cited

U.S. PATENT DOCUMENTS

| 3,863,366 | 2/1975 | Auberry et al. | 36/14 |
| 4,899,465 | 2/1990 | Bleimhofer et al. | 36/12 |
| 5,195,255 | 3/1993 | Coughlin | 36/17 R |
| 5,285,546 | 2/1994 | Haimerl | 36/12 |

FOREIGN PATENT DOCUMENTS

| 3840263 | 5/1990 | Germany . | |
| 4004674 | 8/1991 | Germany | 612/142 T |

OTHER PUBLICATIONS

"Herstellung von Schuhen mit Membran-Zwischenschicht", *Schuh-Technik*, Feb. 1992 pp. 84–86.

Primary Examiner—Bryon P. Gehman
Assistant Examiner—Marie Denise Patterson
Attorney, Agent, or Firm—Oliff & Berridge

[57] ABSTRACT

A waterproof foot covering such as a shoe, boot or the like has a molded-on (foamed-on) outersole and an upper that is lined with a waterproof but water vapor-permeable layer. The lower welt region of the upper is connected to the lower welt region of the waterproof layer and to the outer welt region of the inner sole via an upper band, a lower band, and a multiplicity of tensile-load-resistant straps connecting the upper and lower bands to one another. The lower welt region of the upper is stitched to the upper band. The lower welt region of the waterproof layer and the outer welt region of the inner sole are stitched to the lower band. The straps and the lower band are embedded in the material forming the outersole. This material is connected, in this embedding region, to the waterproof layer in a waterproof manner by molding-on (foaming-on).

14 Claims, 1 Drawing Sheet

WATERPROOF FOOT COVERING

TECHNICAL FIELD

The invention relates to a waterproof foot covering having an inner sole, a molded-on (foamed-on) hard, flexible outersole with a raised edge and an upper that is open at the top and is lined with a waterproof but water vapor-permeable layer.

Foot covering here is understood to mean a shoe, boot or the like. The upper can, as in the case of a boot, be closed all around or can be closable by a zip fastener, a touch-and-close fastener, hooks and eyes, lacing hooks, buttons, etc., or, as in the case of a lace-up shoe, can be closable with shoe laces, etc.

BACKGROUND

Waterproof foot coverings with molded-on (foamed-on) outersoles are commercially available and known.

Also known, in general, are films, membranes, laminates produced therefrom, etc., for the production of clothing articles that are waterproof but water vapor-permeable. It is possible to use them as inner linings, intermediate linings or also as outer material. A waterproof but water vapor-permeable layer here is thus also understood to mean a multi-layer planar structure, a laminate, etc. For the sake of simplicity, the waterproof but water vapor-permeable layer is frequently only designated as "waterproof layer" below. The designation "waterproof foot covering" herein means waterproof but water vapor-permeable foot covering.

Waterproof layers for producing waterproof but water vapor-permeable clothing articles, foot coverings and other articles are likewise known. A very well-known waterproof layer that is also very particularly suitable for the waterproof foot covering according to the invention is SYMPATEX ®.

In the production of waterproof foot coverings with molded-on (foamed-on) outersoles, there is the following problem: to obtain a high flexibility of the outersole (which is desirable in particular for children's shoes and children's boots), work is carried out at least partly without the otherwise conventional lasting margin that is adhesively bonded to the inner sole. This additionally provides cost advantages. Therefore, the lower welt region of the upper, the lower welt region of the waterproof layer and the outer welt region of the inner sole were therefore initially stitched together and subsequently the outersole was molded-on (foamed-on). With this method, however, the stitching material is not reliably embedded in a waterproof manner between the upper (outer material) and the waterproof layer (lining). As a result, water that has penetrated between the upper and the waterproof layer can penetrate, via the stitching material, into the interior, or foot region, of the foot covering. Hence, the stitching material, because of its wick effect, and the needle puncture points, because of their capillary effect, represent water bridges. There has therefore been no lack of attempts to find a practicable solution to this problem. These attempts have to some extent also been successful, at the cost, however, of other functional properties and/or of the cost advantages that were initially achieved in production.

In the case of a waterproof foot covering with molded-on (foamed-on) outersole, and in the production thereof, specifically the following four conditions have to be fulfilled:

(1) before the molding-on (foaming-on) of the outersole, the prefabricated foot covering consisting at least of the upper, the waterproof layer and the inner sole must form an essentially stable, handleable unit. In particular, there should be no displacement of the aforementioned parts with respect to one another either in the longitudinal direction, in the transverse direction or in the vertical direction of the foot covering. Such a displacement would subsequently be irreversibly fixed by the subsequent molding-on (foaming-on) of the outersole and would lead to a deformed, non-dimensionally-true foot covering.

(2) It should be reliably ensured that the lower seam or seams is/are waterproof in the critical region. This should be achieved only by the molding-on (foaming-on) of the outersole, not by previous sealing, adhesion bonding or the like.

(3) Once obtained, the waterproof property should also be maintained during use of the foot covering.

(4) Detachment of the lower welt region of the upper from the raised edge of the outersole should not occur during the use of the foot covering.

SUMMARY OF THE INVENTION

These and other objects are achieved by a foot covering of the present invention. A waterproof foot covering of the invention has an inner sole, a molded-on (foamed-on) hard, flexible outersole with a raised edge, and an upper that is open at the top and is lined with a waterproof but water vapor-permeable layer. The lower welt region of the upper is connected to the lower welt region of the waterproof layer and to the outer welt region of the inner sole via an upper band, a lower band and a multiplicity of tensile-load resistant straps connecting the upper band and the lower band to one another. The upper and lower bands and the straps form an essentially displacement-resistant unit, in that the lower welt region of the upper is stitched to the upper band and the lower welt region of the waterproof layer and the outer welt region of the inner sole are stitched to the lower band, in that the straps and the lower band are embedded in the material forming the outersole, and in that said material is connected, in this embedding region, to the waterproof layer in a waterproof manner by molding-on (foaming-on).

BRIEF DESCRIPTION OF THE DRAWINGS

The invention is explained in greater detail below with the aid of the drawings in which, in a simplified diagrammatic representation.

DETAILED DESCRIPTION OF PREFERRED EMBODIMENTS

Figure 1:
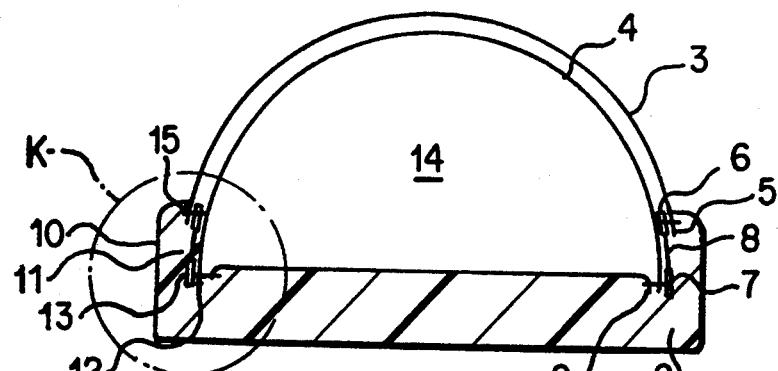
FIG. 1 shows a cross-section through the front region of an embodiment of the waterproof foot covering.

The lower welt region of the upper is indirectly connected to the lower welt region of the waterproof layer and to the outer welt region of the inner sole. This indirect connection takes place via the upper band, the straps and the lower band. As a result, the lower seam, i.e., the critical seam that leads to a perforation of the waterproof layer in this region and thus to a connection into the interior of the foot covering, is reliably and completely, and thus in a waterproof manner, embedded in the material forming the foot sole during molding-on (foaming-on) of the outersole. The material forming the foot sole may, for example, be a plastic, a natural or synthetic rubber or the like. It is actually first of all flowable and can thus—considered in the flow direction—flow from the outside inwards past the straps as far as the waterproof layer and from there downwards, and also from the bottom upwards. It can penetrate into the lower band and completely permeate the latter. By this means, the stitching material guided through the lower band is also embedded completely, and thus in a waterproof manner, and the needle puncture holes are sealed in a waterproof manner.

The upper band and the lower band and the straps form an essentially displacement resistant unit, which is achieved in that the straps are designed so as to be rigid and are essentially firmly connected to the bands, and thus act as spacers. As a result, a stable unit is obtained. This unit can be handled during further processing and is comprised of the upper, the waterproof layer, the inner sole and the bands and straps themselves. The unit formed from the two bands and the straps is thus flat and strip-shaped in design. It is therefore flexible, for example like a film strip, and can be readily rolled up. The essentially rigid straps, however, provide the transverse stability required for processing, so that the unit functions, inter alia, as a spacer.

The adequate tensile strength of the straps and the adequately tensile-load-resistant connection between the straps and the bands reliably prevent detachment of the lower welt region of the upper from the raised edge of the outersole, even after relatively long use of the foot covering. During the production of the foot covering, in particular before and during the molding-on of the outersole, the strip-shaped unit formed from the bands and the straps thus functions, in an outstanding manner, as an adequately rigid holding means and spacer between the upper and the inner sole. Subsequently, that is to say in the ready to-use foot covering, the strip-shaped unit functions as a tensile-load-resistant reinforcement.

Depending on the design of the foot covering and the possibly different requirements associated therewith, the upper band and the lower band can be different in design. This is an important aspect of the invention. It is thereby possible to adapt the three elements forming the essentially displacement-resistant unit, each individually and independently of one another, to the possibly completely different requirements in the production and use of the foot covering. In this manner, by simple experiments, it is possible to achieve an optimization of this critical region of the waterproof foot covering.

The central region, formed by the straps, of this strip-shaped unit furthermore has a substantially lower material density than the upper band and the lower band. This fact is very advantageous in particular in fabrication. Even in the fabrication to small radii (such as, for example, in the production of children's shoes), said strip-shaped unit leads to, at the most, less pleating. In general it leads to no pleating.

The bands are preferably designed as textile, in particular woven, knitted or braided bands. Moreover, multifilaments, in particular textured multifilaments, have proved particularly advantageous for the bands. This helps achieve the result that the two bands, or at least the lower band, can be completely permeated from all sides by the molding-on (foaming-on) material forming the outersole, in order to achieve a reliable, durable, waterproof sealing even of the stitching material running through the bands.

The straps are preferably formed from a monofilament which runs, for example, alternately through the upper band and the lower band and is bound into the bands.

For the bands and the straps, or at least for the straps, a material is to be chosen that does not melt during the molding-on (foaming-on) of the outersole and also does not undergo substantial loss of strength or substantial change in length.

Other suitable embodiments of the bands and/or the straps or the strip-shaped unit can be produced by simple experiments or—if already available—tested for their suitability.

Polyester, polypropylene, polyamide and polyether have proved to be particularly suitable for the materials for the bands and the straps. However, it is also possible to use natural fibers and synthetically produced cellulosic fibers, insofar as the filaments or yarns produced therefrom have a substantially smooth surface (smooth yarns) without protruding fibers. The use of metallic filaments (wires) is also possible.

The straps, or at least some thereof, run preferably essentially perpendicularly to the bands, to ensure the required dimensional stability in the transverse direction of the strip-shaped unit.

The foot covering may be produced, for example, in that first one upper band is stitched from the inside onto the shortened outer material. Then the lower band, together with the lining, is stitched onto the inner sole. The finished upper is then pulled onto the last and aligned. Subsequently the outersole is molded-on. Example (all numerical figures are approximate values)

A strip-shaped unit suitable for producing the waterproof foot covering and having a width of 10 mm is formed of an upper band and a lower band each having a width of 2 mm. The straps are 6 mm long and have a diameter of 0.1 mm. The center distance between two respectively adjacent straps is 1 mm. The entire strip-shaped unit is produced by a knitting process in which the monofilament forming the straps is bound alternately into one and the other band, resulting in a meandering course of the monofilament. The tensile strength of the 1200 dtex polyethylene monofilament, and thus of the straps, is 49 N. The bands are produced from textured 400 dtex PES f72 filaments having a tensile strength of 8 N.

All dimensions and parameters of the filaments, the straps, the bands or the strip-shaped unit formed therefrom can be freely chosen within the scope of the conditions mentioned herein and moreover are guided, for example, by the nature and size of the waterproof foot covering or by points of view of expediency.

For example, a strip-shaped unit obtained from Bob-Textilwerk, August Banger, Wuppertal under Article No. 977 380 has proved suitable.

In the figures, the following numbers designate the following parts:
 1 Inner sole
 2 Outersole
 3 Upper
 4 Waterproof layer
 5 Lower welt region of the upper
 6 Upper band
 7 Lower band
 8 Tensile-load-resistant straps
 9 Outer welt region of the inner sole 10 Raised edge of the outsole
11 Embedding region
12 Lower edge region of the waterproof layer
13 Stitching material (lower band)
14 Inner space (foot space) of the foot covering
15 Stitching material (upper band)

Figure 1A:
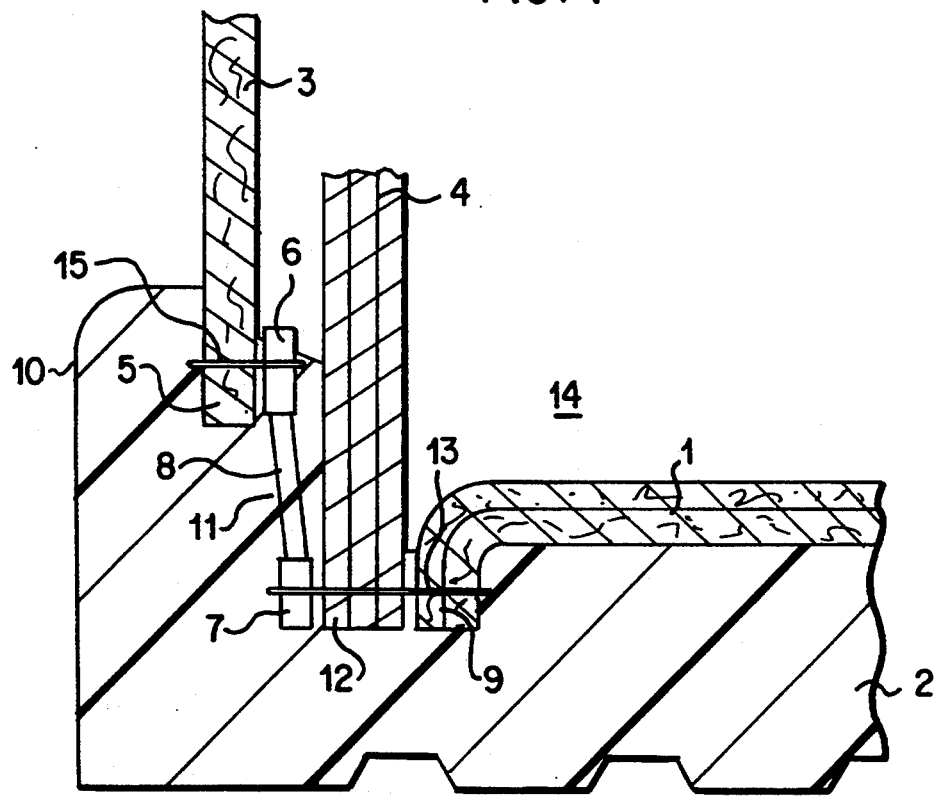
FIG. 1a shows an enlarged detail from FIG. 1

The cross-section, illustrated in FIG. 1, of the front part of a typical embodiment of a waterproof foot covering, for example of a shoe, and the enlarged detail (lying in the circle K of FIG. 1) shown in FIG. 1a show the inner sole 1, the molded-on (foamed-on) hard, flexible outersole 2 with the raised edge 10, the upper 3, which is open at the top and is lined with the waterproof but water vapor-permeable layer 4, the lower welt region 5 of the upper 3 that is stitched to the upper band 6, the lower band 7 that is stitched to the lower welt region 12 of the waterproof layer 4 and to the outer welt region 9 of the inner sole 1, the tensile-load-resistant straps 8 that connect the two bands 6 and 7 together to produce an indirect connection of the lower welt region 5 of the upper 3 to the lower welt region 12 of the waterproof layer 4 and to the outer welt region 9 of the inner sole 1.

As shown by the grid symbolizing the outersole 2 and the raised edge 10, that is to say the (molded-on) material forming the outersole 2 and the raised edge 10, the material extends as far as the waterproof layer 4 and, owing to the molding-on (foaming-on), forms a waterproof connection therewith. The straps 8, lower band 7, and stitching material 13 are also completely embedded in this material and are thus enclosed in a waterproof manner. Water that has passed through the upper 3 into the interspace between the upper 3 and the waterproof layer 4 cannot pass into the interior of the waterproof foot covering, that is to say the foot space 14. This is because on the one hand the layer 4 is waterproof and on the other hand the stitching material 3 and the (not illustrated) needle puncture holes are encapsulated by the embedding in such a manner that the water cannot penetrate as far as them. Embedding of the upper band 6 and of the stitching material 15 running therethrough is also desirable. However, it is not absolutely necessary for the waterproof property of the foot covering, since there is no connection to the inner space 14 of the foot covering at this point.

Figure 2:
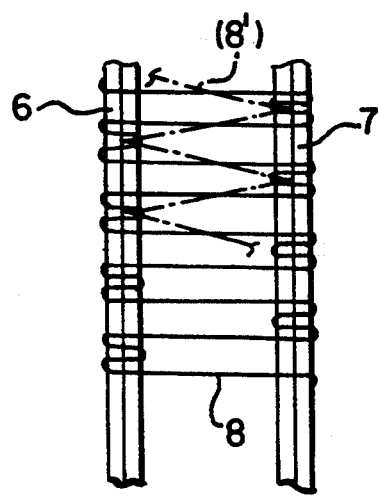
FIG. 2 shows a plan view of an example of a strip shaped unit.

FIG. 2 shows a plan view of a strip-shaped, essentially displacement-resistant unit comprised of the upper band 6, the lower band 7 and the tensile-load-resistant straps 8 connecting the two bands 6, 7 to one another. In this embodiment, the straps 8 are formed by a filamentous means which is passed alternately through or over the bands 6, 7 and is connected firmly thereto. The straps 8 are arranged essentially perpendicularly to the bands 6, 7, that is to say essentially perpendicularly to the longitudinal axis thereof. The course of the filamentous means forming the straps 8 is thus essentially meandering. As the dotted zig-zag line shows, a second filamentous means could additionally be arranged, which would form the straps (8') that would be arranged obliquely to the longitudinal axis of the bands 6, 7—that is to say not perpendicularly. The straps (8') formed in this manner and arranged obliquely alternately in one and the other direction would further increase the displacement resistance of the strip-shaped unit. A unit that had only obliquely running straps (8') would, if designed expediently, have sufficient tensile and displacement resistance. It would, however, possibly not have adequate flexural strength in the transverse direction, since compressive loading in the transverse direction of the strip-shaped unit would rather lead to a folding in of the oblique straps (8'), as is the case when the straps 8 are arranged perpendicularly to the longitudinal axis of the bands 6, 7.

The production of the strip-shaped unit shown as an example in FIG. 2 can take place as described above. However, it can also take place, for example, by placing on two prefabricated bands (which are arranged parallel to one another and subsequently form the bands 6 and 7) a filamentous means in a meandering, zig-zag, undulating or similar manner and connecting it firmly to said bands. It may be connected, for example, by adhesively bonding or welding. The straps 8 can also be formed by extruding on a flowable or viscous composition that cures after the extrusion. In this manner it is possible, by intermittent extrusion and interruption of the extrusion, to form only the straps themselves, comparable with the rungs of a ladder.

The production of the strip-shaped displacement-resistant unit from one material strip that meets all other requirements is also possible by punching out the empty spaces enclosed in each case by two straps 8, a section of the band 6 and a section of the band 7. In this manner it is also possible to punch out non-rectangular, for example, round or oval, empty spaces. This can lead to straps 8 that do not have a cross-section that is constant over their length.

It is important for the strip-shaped displacement-resistant unit formed from the three elements 6, 7, 8, that the middle region formed by the straps 8 has a substantially lower material density than the bands 6 and 7 and that the bands 6 and 7 are as narrow as possible. In this case, a generally pleat-free fabrication of the unit is thereby achieved even in the case of small radii of curvature.

An important feature of the invention in all embodiments of the strip-shaped unit suitable for the waterproof foot covering according to the invention is that—seen in plan view—the projection area of the empty spaces between the straps is—if appropriate substantially—larger than the projection area of the straps.

I claim:
1. A waterproof foot covering, comprising:
   an inner sole,
   a molded-on hard, flexible outersole with a raised edge,
   an upper that is open at the top and is lined with a waterproof but water vapor-permeable layer,
   a multiplicity of tensile-load resistant straps extending between a lower welt region of the upper and a lower welt region of the waterproof layer,
   an upper band being a separate element from and connected to the multiplicity of straps, the upper band being stitched to the lower welt region of the upper,
   a lower band being a separate element from and connected to the multiplicity of straps, the lower band being stitched to the lower welt region of the waterproof layer and an outer welt region of the inner sole,
   the lower welt region of the upper being stitched to the upper band and the lower welt region of the waterproof layer and the outer welt region of the inner sole being stitched to the lower band, so that the upper and lower bands and the straps form an essentially displacement-resistant unit for maintain- ing a substantially fixed relationship between the upper and the inner sole, the straps and the lower band being embedded in material forming the outersole, and the material being molded-on in an embedding region, to the waterproof layer in a waterproof manner.

2. Foot covering according to claim 1, wherein said straps are rigid.

3. Foot covering according to claim 1, wherein said straps comprise monofilaments.

4. Foot covering according to claim 3, wherein the monofilaments pass alternately through the upper band and the lower band and are bound into the upper and lower bands.

5. Foot covering according to claim 1, wherein the straps are arranged essentially perpendicularly to the upper and lower bands.

6. Foot covering according to claim 1, wherein the lower band is a textile band.

7. Foot covering according to claim 6, wherein the textile band is woven.

8. Foot covering according to claim 1, wherein the upper band is a textile band.

9. Foot covering according to claim 8, wherein the textile band is woven.

10. Foot covering according to claim 1, wherein at least one of the upper band and the lower band comprises at least one multifilament.

11. Foot covering according to claim 6, wherein the textile band is knitted.

12. Foot covering according to claim 6, wherein the textile band is braided.

13. Foot covering according to claim 8, wherein the textile band is knitted.

14. Foot covering according to claim 8, wherein the textile band is braided.

* * * * *